United States Patent [19]
Burns

[11] Patent Number: 5,514,232
[45] Date of Patent: May 7, 1996

[54] METHOD AND APPARATUS FOR AUTOMATIC FABRICATION OF THREE-DIMENSIONAL OBJECTS

[76] Inventor: Marshall Burns, 549 Landfair Ave., Los Angeles, Calif. 90024

[21] Appl. No.: 157,645

[22] Filed: Nov. 24, 1993

[51] Int. Cl.⁶ .................................................. B32B 31/00
[52] U.S. Cl. ........................... 156/64; 156/234; 156/235; 156/247; 156/248; 156/249; 156/257; 156/268; 156/362; 156/517; 156/540; 156/584
[58] Field of Search ..................................... 156/230, 234, 156/235, 247, 248, 249, 257, 268, 344, 362, 516, 517, 540, 563, 566, 584, 58, 59, 64

[56] References Cited

U.S. PATENT DOCUMENTS

| | | | |
|---|---|---|---|
| 2,015,457 | 9/1935 | Morioka | 156/58 |
| 3,866,052 | 2/1975 | DiMatteo et al. | 250/558 |
| 3,932,923 | 1/1976 | DiMatteo | 156/253 X |
| 4,575,330 | 3/1986 | Hull | 156/58 X |
| 4,665,492 | 5/1987 | Masters | 264/24 X |
| 4,752,352 | 6/1988 | Feygin | 156/517 X |
| 4,863,538 | 9/1989 | Deckard | 156/62.2 |
| 5,015,312 | 5/1991 | Kinzie | 156/58 X |
| 5,071,503 | 12/1991 | Berman | 156/250 |
| 5,088,047 | 2/1992 | Bynum | 364/474.24 |
| 5,121,329 | 6/1992 | Crump | 264/25 X |
| 5,135,379 | 8/1992 | Fudim | 264/22 X |
| 5,171,490 | 12/1992 | Fudim | 264/22 |
| 5,192,559 | 3/1993 | Hull et al. | 156/501 X |
| 5,354,414 | 10/1994 | Feygin | 156/630 |

FOREIGN PATENT DOCUMENTS

| | | |
|---|---|---|
| WO90/02361 | 3/1990 | WIPO . |
| WO91/12957 | 9/1991 | WIPO . |
| PCT/SE91/000597 | 10/1991 | WIPO . |

Primary Examiner—David A. Simmons
Assistant Examiner—Paul M. Rivard
Attorney, Agent, or Firm—John J. Connors; Connors & Associates

[57] ABSTRACT

Disclosed is a method and apparatus for automatically fabricating a three-dimensional object from individual layers of fabrication material having a predetermined configuration. Successive layers are stacked in a predetermined sequence and affixed together to form the object. The fabrication material is carried on a substrate to a stacker station. At this station the individual layers are stacked together, with successive layers being affixed to each other, with the substrate removed after affixation.

32 Claims, 10 Drawing Sheets

METHOD AND APPARATUS FOR AUTOMATIC FABRICATION OF THREE-DIMENSIONAL OBJECTS

BACKGROUND OF THE INVENTION

1. Field of the Invention

This invention relates to a method and apparatus for automatic fabrication of three-dimensional objects from a plurality of individual layers of fabrication material stacked together in sequence to form the object. More particularly, the invention relates to the use of a substrate to convey each layer to a station where these layers are affixed to each other and then the substrate is removed.

2. Background Discussion

The idea of automatic fabrication of three-dimensional solid objects dates back at least to the 18th century, when a pantograph-like device was used in France to copy medallions. James Watt later built several machines, based on the same principal, capable of carving full human busts. Over the past 45 years, machining, lathe-turning and grinding devices have been placed under computer control (called "CNC" for "computer-numerical control") to allow the generation of original shapes from designs entered into computers by engineers using computer-aided design (CAD) software. These processes are called "subtractive" fabrication, because they start with a solid block of material and generate the desired shape by removing material from the block.

Since the subtractive processes work by applying a cutting tool to a solid block, they have the common disadvantage of being limited in the shapes that they can generate. Intricate or nested structures are difficult or impossible to build by these methods. A more modern approach is "additive" fabrication in which a fluid or powdered material is solidified or congealed in successive small regions or layers to form the desired object. This idea goes back at least to the photo-relief process of Baese (U.S. Pat. No. 774,549), and has been substantially refined through dual-laser photopolymerization of Swainson (Danish Patent Application 3611), liquid droplet deposition of Masters (U.S. Pat. No. 4,665,492), single-laser photopolymerization of Andre (French Patent Application 84 11241) and Hull (U.S. Pat. No. 4,575,330), masked-lamp photopolymerization of Fudim (U.S. Pat. No. 5,135,379), laser sintering of Feygin (U.S. Pat. No. 4,752,352) and Deckard (U.S. Pat. No. 4,863,538), and robotically guided extrusion of Crump (U.S. Pat. No. 5,121,329).

There are also several hybrid processes which combine additive and subtractive processes. Usually this involves cutting or etching the contours of individual layers of an object, and stacking and binding the contours. The earliest use of such a process is that of Morioka (U.S. Pat. No. 2,015,457), and more recent refinements have been made by DiMatteo (U.S. Pat. No. 3,932,923), Feygin (U.S. Pat. No. 4,752,352), Kinzie (U.S. Pat. No. 5,015,312), and Berman (U.S. Pat. No. 5,071,503).

A Swedish company, Sparx AB, manufactures a manual system which uses a substrate to carry a foam sheet of fabrication material bonded to the substrate. Individual layers of material are formed by cutting through the material, removing negative regions, and, prior to affixing successive layers, removing the substrate.

All of the prior additive and hybrid processes suffer from several or all of the following drawbacks:

(1) Accuracy and resolution are limited to the domain of about 0.1 millimeters (0.004 inch). One reason is the difficulty of controlling the action of a laser beam (whether for irradiating, as in Hull or Deckard, or for cutting, as in Feygin), a particle jet (as in Masters), or an extrusion head (as in Crump), plus the difficulty of compensating for the width of the laser beam, jet stream or extrusion bead. Another reason is the minimum thickness of a single layer that can be formed from the raw material liquid or powder, or the minimum thickness of the extrusion bead that can be laid down.

(2) In the fully additive processes, large regions of solid material take a long time to fabricate, slowing down the process for building structures with such large solid regions.

(3) All of the processes are difficult and expensive to scale up for fabrication of large objects, because they involve complicated mechanisms of laser optics or robotics.

(4) All of the processes call for fabrication specifically in very thin layers, which limits the fabricator speed unnecessarily in cases where great resolution in the vertical direction is not necessary. In many instances, fabricator users would like to get a fast, low resolution, rendition of the desired object, but none of the prior art provides a way to achieve this.

(5) Only Kinzie and Crump provide a way to achieve a mixture of colors in the object generated. Kinzie requires a secondary printing process on a special absorbent or translucent material to achieve this, and Crump requires the use of specially died materials.

(6) All of the processes always produce a solid object in a permanently fixed configuration, such that any fracturing or cross-sectioning of the object is tantamount to destroying it. No means has ever been provided for generating an object which can be temporarily taken apart into sections and easily reassembled with no loss of integrity.

(7) The raw materials for most of the processes are specialty chemicals which are expensive and, in some cases, are toxic or require special handling to prevent combustion.

(8) Many of the processes are limited to working with certain types of materials such as only photopolymers in the simple photocuring methods, or only thermally softenable materials in laser sintering.

(9) Most of the processes hide the object being built in an opaque solid or a murky liquid environment, depriving the fabricator user from the pleasure and benefit of watching the object take shape.

(10) All of the processes, except that of Sparx AB, use complicated and expensive mechanisms and/or electro-optical devices, making fabricators based on them large, heavy, expensive and difficult to maintain.

The ultimate commercial importance of automatic fabrication of three-dimensional objects is hampered by these disadvantages.

SUMMARY OF THE INVENTION

ADVANTAGES OF THE INVENTION

The method and apparatus of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS" one will understand how the features of this invention provide its advantages, which include:

(1) Accuracy and resolution can both be easily achieved in the domain of about 0.05 millimeters (0.002 inch). This can be further reduced to less than about 0.01 millimeters (0.0004 inch) with specially accurate cutting or positioning mechanisms and very thin materials.

(2) In several embodiments of this invention in which layers of the desired object are cut from sheet material, large regions of solid material are fabricated very quickly because they only require cutting around the periphery.

(3) In embodiments of this invention in which layers of the desired object are cut from sheet material, it is easy to scale up to build large objects. This is because the required mechanisms and components are quite simple and, in many cases, are already available for other purposes in large size formats.

(4) Thicker layers of materials are used when vertical resolution can be sacrificed for speed. This option is analogous to the "draft mode" available on dot matrix printers to achieve fast, low resolution, output. A means (angular cutting) is also provided for ameliorating this reduction of resolution.

(5) Colors can be easily incorporated and mixed in any desired degree of complexity in the fabricated object. For several embodiments, in which layers of the desired object are cut from sheet material, at least 60 colors are already available.

(6) In one variation of the method of this invention, fabricated objects are not permanently fixed, but can be easily separated at any one or more of many cross sections. The resulting sections can then be easily rejoined to form again the complete object. The object can be thus separated and rejoined at the same or different cross sections, repeatedly and without limitation.

(7) For several embodiments of this invention in which layers of the desired object are cut from sheet material, the raw materials are readily available and include inexpensive varieties. The materials are nontoxic and have no special handling or storage requirements.

(8) A wide variety of materials may be used in the process, including, metals, plastics, ceramics, and composites.

(9) The method of this invention can be practiced so as to leave the object being built visible during the fabrication process, providing the user with the pleasure and benefit of watching the object take shape.

(10) The method can be embodied using simple and inexpensive mechanisms, so that the fabricator equipment can be relatively small, light, inexpensive and easy to maintain.

Method

The invention includes a method for fabricating a three-dimensional object from fabrication material formed into individual layers on a carrier substrate. Each layer has a predetermined configuration, and successive individual layers are stacked in a predetermined sequence and affixed together to form the object. The layers may vary in curvature, thickness, color, outline, and material composition from layer to layer or even within an individual layer.

The method includes the steps of (a) providing a station were the successive individual layers are stacked together, (b) placing on a carrier substrate a first individual layer of fabrication material, (c) conveying the first layer of fabrication material on said carrier substrate to said station and transferring to said station, (d) separating the carrier substrate from the fabrication material, exposing a bonding surface on said first individual layer to which a successive individual layer is affixed, (e) placing on the carrier substrate a second layer of fabrication material and conveying the second layer of fabrication material on the carrier substrate to said station, (f) aligning said individual layers and bringing said bonding surface on said one individual layer into contact with said successive individual layer so that said layers become affixed together, (g) separating said carrier substrate from the fabrication material after affixing said one individual layer to said successive layer, exposing a bonding surface on said successive individual layer to which another successive fabrication layer is affixed, and (h) repeatedly aligning and then affixing successive fabrication layers together after conveying said successive fabrication layers on the carrier substrate in series to the station until said object is formed, first affixing individual successive fabrication layers together and then separating the carrier substrate from each individual, successive fabrication layer.

The method of this invention can be implemented in either an additive embodiment or a hybrid embodiment where material is both added and subtracted. In the additive embodiment, the method calls for depositing on the carrier substrate successive layers of fabrication material having a configuration with predetermined boundaries where substantially no material is deposited outside the boundaries.

In the hybrid embodiment, the method calls for dividing the layers of fabrication material into a negative region of waste material and a positive region corresponding to the configuration of an individual fabrication layer, and then removing the negative region along with the substrate after first affixing successive fabrication layers together. The fabrication material may be in the form of a sheet of fabrication material supported by the carrier substrate, and the positive and negative regions may be formed by cutting through the material but not cutting through the substrate. The negative region may be left in place on the substrate when this layer is conveyed to the stacking station, and removed along with the substrate when the substrate is separated from the positive region of material bonded to the affixed-together stack of layers at this station. An adhesive may be used on the bonding surface to hold the fabrication material to the substrate but allowing the substrate to be separated from the fabrication material when successive layers are affixed together.

Apparatus

In general, the apparatus includes a fabrication station where successive layers of fabrication material are formed on a carrier substrate and then conveyed to a stacking station where they are separated from the substrate and bonded together to form the desired three-dimensional object. Its several features are as follows:

The first feature of the apparatus of this invention is the fabrication station where the successive, individual fabrication layers are formed on successive carrier substrates. The individual layers of fabrication material each have a predetermined configuration, and successive layers are stacked in a predetermined sequence and affixed together to form the object at a stacking station. The substrate and fabrication material may be in the form of a sheet and there may be an adhesive on the bonding surface which holds the fabrication material to the substrate but allows the substrate to be separated from the fabrication material when successive layers are affixed together.

The second feature is that a cutter may be used to cut through the material, but not the substrate, to divide the fabrication material on the carrier substrate into a negative region of waste material and a positive region corresponding to the configuration of an individual layer. In one embodiment, a waste material removing mechanism removes the negative region of fabrication material from the substrate prior to the affixation of the successive layers. The negative region of fabrication material may also remain on the substrate until after the affixation of successive layers, and then the substrate is separated, with the negative region adhering thereto and being separated from the affixed layers.

In an alternate embodiment, a deposition mechanism is used to deposit on a carrier substrate a fabrication material to form successive layers, each successive layer having a configuration with predetermined boundaries, with substantially no material deposited outside said predetermined boundaries.

The third feature is a conveyor for conveying in the predetermined sequence the successive, individual fabrication layers on the successive carrier substrates from the fabrication station to the stacking station. A registration mechanism aligns the successive fabrication layers so that each successive fabrication layer is in registration.

The fourth feature is that successive carrier substrates may be sections of a continuous belt which travel along a predetermined path past the fabrication and stacking stations. There are means for placing onto the belt in advance of the stacking station fabrication material corresponding to the physical dimensions of an individual layer. When the fabrication material is cut into positive and negative regions, there are means for removing the positive region from the belt and transferring this positive material to the stacking station and then for subsequently removing the negative region prior to placing onto the belt a successive layer of fabrication material. Instead of a continuous belt, the substrate may be a series of individual sheets, sections of a roll of material, or a single plate used repeatedly, or a revolving set of such plates.

The fifth feature is a separator which separates each successive carrier substrate from the fabrication layer thereon to expose a bonding surface on each individual fabrication layer. An affixing mechanism brings an individual fabrication layer at the stacking station into contact with the next successive fabrication layer conveyed to the stacking station, allowing or inducing the layers to bond to each other.

The sixth feature is that the separator separates each successive, individual carrier substrate from the fabrication layer thereon after affixation of this layer to the previous fabrication layer.

DESCRIPTION OF THE DRAWING

The preferred embodiments of this invention, illustrating all its features, will now be discussed in detail. These embodiments depict the novel and non-obvious method and apparatus of this invention shown in the accompanying drawing, which is for illustrative purposes only. This drawing includes the following figures (FIGS.), with like numerals indicating like parts.

DESCRIPTION OF THE PREFERRED EMBODIMENTS

Method

Figure 1:
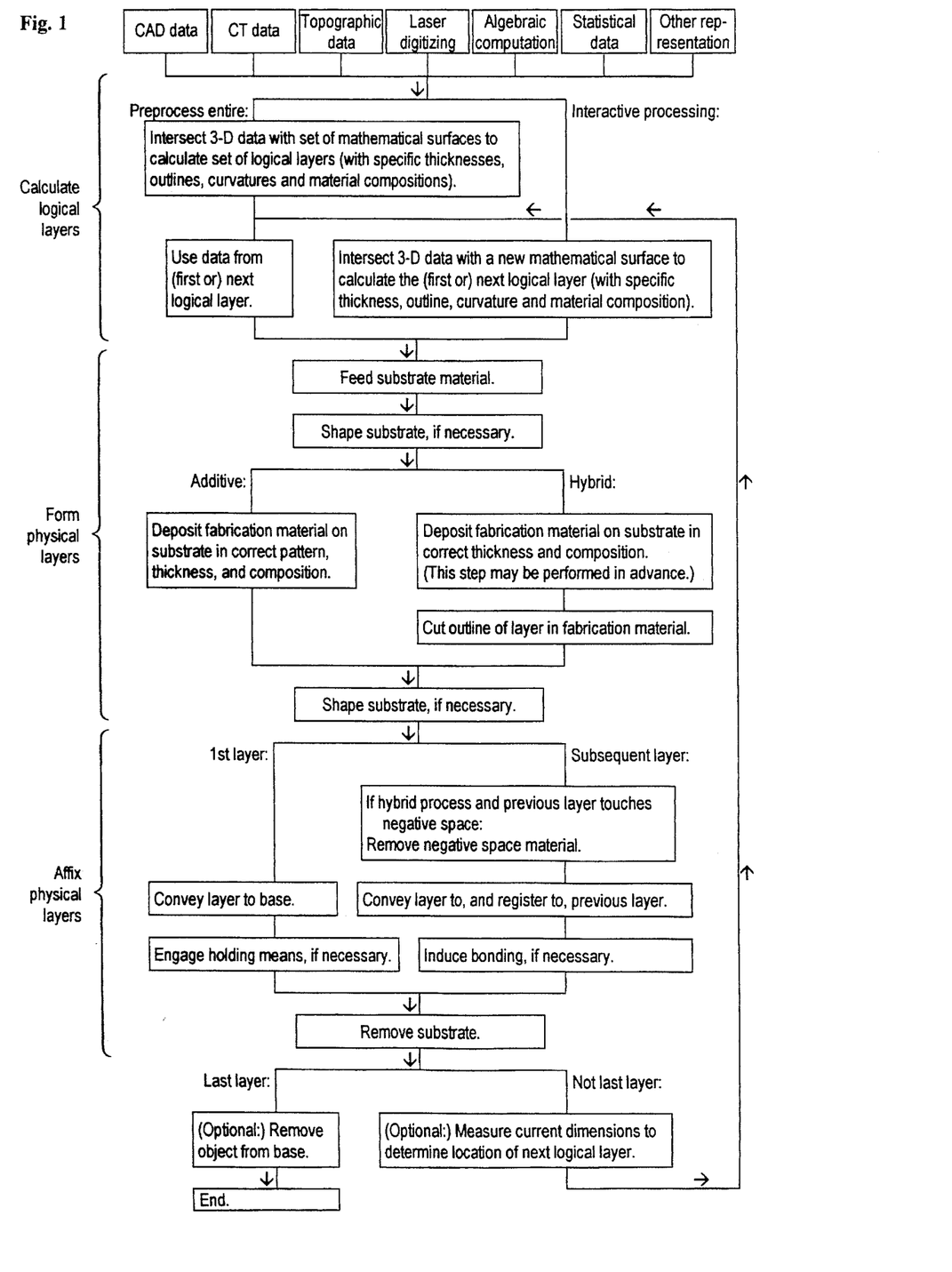
FIG. 1 is a flow chart illustrating the fabrication method of this invention.

The flow chart of FIG. 1 depicts the method of this invention, which includes three primary operations:

I Mathematical Modeling

A mathematical model of the object is made, where a data representation of the desired three-dimensional object is ordered in a set of numerical representations of layers which, together, represent the whole object. In other words, a series of data packages, each data package corresponding to the physical dimensions of an individual layer of fabrication material, is stored in the memory of a computer in logical sequence so that the data packages correspond to individual layers of fabrication material stacked together to form the object.

Creation of data packages:

Prior to formation of the physical layers from the fabrication material, the geometry of the desired three-dimensional object is logically divided into a sequence of mutually adjacent theoretical layers, with each theoretical layer defined by a thickness and a set of closed, nonintersecting curves lying in a smooth two-dimensional surface. These theoretical layers, which exist only as data packages in the memory of the computer, are referred to as "logical layers." In the simplest circumstance, each two-dimensional logical layer will be a plane so that each layer will be flat, and the thickness will be the same throughout any particular layer. However, this is not necessarily so in every case, as a layer may have any desired curvature and the thickness of a layer may be a function of position within its two-dimensional surface. The only constraint on the curvature and thickness function of the logical layers is that the sequence of layers must be logically adjacent. This means that, in considering two layers that come one after the other in the sequence, the mutually abutting surfaces of the two layers must contact each other at every point, except at such points of one layer where the corresponding point of the other layer is void of material.

The data packages for the logical layers may be created by any of several methods:

(1) For a three-dimensional computer-aided design (CAD) model, by logically "slicing" the data representing the model, (2) For topographic data, by directly representing the contours of the terrain, (3) For a geometrical model, by representing successive curves which solve z=constant for the desired geometry, and (4) Other methods appropriate to data obtained by computer tomography, satellite reconnaissance, laser digitizing, line ranging, or other methods of obtaining a computerized representation of a three-dimensional object.

Interactive processing of logical layers.

An alternative to calculating all of the logical layers in advance is to perform measurements of the dimensions of the growing object as each new layer is bonded, and to use this information to help in the determination of where each new logical layer of the object should be, and possibly what the curvature and thickness of each new layer should be. This will often result in more accurate final dimensions of the fabricated object because the actual thickness of a sequence of bonded layers may be different than the simple sum of the intended thicknesses of the individual layers.

Positive and negative regions.

The closed, nonintersecting curves that are part of the definition of each layer unambiguously divide a smooth two-dimensional surface into two distinct regions. ("Region" does not mean a single, connected area. Each region may consist of several island-like subregions that do not touch each other.) One of these regions is the intersection of the surface with the desired three-dimensional object, and is called the "positive region" of the layer. The other region is the portion of the surface that does not intersect the desired object, and is called the "negative region." The curves are the boundary between the positive and negative regions, and are called the "outline" of the layer.

II Formation Of The Physical Layers

The data packages are stored in the memory of the computer, which controls the operation of the fabrication equipment. Using these data packages, the computer controls automated fabrication equipment to manipulate the fabrication material to form on the surface of a substrate an individual layer of material in accordance with the specifications of an individual data package. The fabrication material used to form the layers has the property that layers brought into contact bond to each other. Possibly, the accordance with the specifications of an individual data package. The fabrication material used to form the layers has the property that layers brought into contact bond to each other. Possibly, the material may require ancillary treatment to have the desired bonding characteristic.

Properties of the fabrication material.

It is not necessary that the deposited material have structural integrity upon being deposited. It should be capable of forming a physical layer which maintains the desired pattern and thickness on the substrate during conveyance, and is capable of assuming a state of structural integrity when bonded to the previous physical layer. For example, the deposited material may be a powder or a gel which, if shaken vigorously, might fall off the substrate or become smeared, but which, protected from shaking, remains in place on the substrate. Furthermore, the fabrication material may or may not be homogeneous. It may, for example, exhibit variations in composition based upon the structural requirements of the desired object being built. These variations may serve to accomplish internal variations of the physical properties of the object, such as hardness, mass density, coefficient of thermal expansion, color, etc. Another case in which the fabrication material may be inhomogeneous would be one in which the fabrication material consists of a stratum of a primary material and a stratum of adhesive material. In this example, the primary material would provide the gross physical characteristics of the object, while the adhesive would generally provide bonding between the layers, although the adhesive can also contribute to the overall characteristics.

Fabrication raw materials.

The raw materials that can be used to form the layers include various types and combinations of metals, plastics, ceramics, and composites, such as:

(a) Hardenable pastes and gels, including (i) common adhesives, such as Elmers® glue from Borden Inc. of Columbus, Ohio, (ii) metal or ceramic powders or whiskers suspended in a polymer matrix, such as Fodel® and Formon® thick film compositions from DuPont of Wilmington, Del., (iii) sol-gel derivatives, such as ormosils (organically modified silicates), and ceramers, and (iv) other formulations of pastes and gels.

(b) Molten metals, thermoplastics, and ceramics, which harden by freezing.

(c) Plastic resins that harden by various means, such as photonic, thermal, electrostatic, and other means.

(d) Other soft or fluid materials which are hardenable or fusible by various means, (e) Plastic, metal, paper, or ceramic sheets with adhesive coating, such as Calon® II cast vinyl film from Arlon of Santa Ana, Calif., ScotchCal® films from 3M Company of St. Paul, Minn., and sandblast stencil material from Anchor Continential, Inc. of Columbia, S.C.

(f) Sheet materials that engage in bonding without the use of an adhesive, such as the cohesive vinyl used in the manufacture of Stik-ees® glueless plastic decals by Stik-ees® of Vista, Calif., or Koroseal® flexible magnetic sheeting from RJF International Corporation of Cincinnati, Ohio.

(g) Various combinations of plastic, metal, or ceramic sheets, strips, and/or filaments with molten, thermosetting, or other type of binder or matrix material.

(h) Other appropriate combinations of materials.

Methods of varying material composition.

If variation of the composition of the fabrication material is desired within any particular layer, and if the mechanism for depositing the fabrication material has the capability of depositing the required various compositions automatically, then the variation in composition may be represented mathematically within the data package for each layer, and the mathematical representation used to control the composition of material deposited. However, if the mechanism for depositing the fabrication material is limited to providing layers of any one specific composition at a time, then variations in composition may be accomplished by logically separating a particular layer into sublayers, where each sublayer is composed of a different material, and the union of the sublayers is equal to the particular layer. Each sublayer is then treated as a distinct layer in the fabrication process, and the complete layer is formed by the formation and bonding of a succession of its constituent sublayers. If the interface between sublayers is along surfaces perpendicular to the layers, and not along surfaces parallel to the layers, then the bonding of each sublayer is not to the previous sublayer, but to the previous complete layer.

"Draft Mode" fabrication.

Depending on the method of depositing the fabrication material, the fabrication process will often go faster if the layers are thicker. However, thicker layers reduce the layer-to-layer resolution of the fabricated object. Thus, there is a trade-off between speed and layer-to-layer resolution. This trade-off can be used to advantage by building initial rough models of the desired three-dimensional object quickly, and then reducing the layer thickness as the design becomes more certain and a more careful representation is desired. This is similar to the option provided in dot matrix printers between "draft mode" and "correspondence mode" printing.

Description of the substrate.

If the layers are flat, or if they only have curvature in one axis, then the substrate may be a simple sheet material, such as paper, plastic or metal. In this case, the substrate may be, for example, a separate sheet for each layer, or it may be a long roll on which fabrication material has been deposited in advance, or it may be a continuous roll that is cycled through the fabrication equipment to serve over and over again for new layers. If, however, the layers have more complicated curvature, then the substrate must be a flexible material, capable of assuming the correct curvature and imposing that curvature on the fabrication material. For example, the substrate may have a structure resembling that of crepe paper, and be attached to a system of robotically controlled fingers capable of manipulating its shape. In another example, the substrate may be a sheet of plastic with a great tolerance for stretching, and be attached to a system of electromagnetically controlled rods that push and pull on it to create the desired shape. The curvature of the substrate may be set prior to the deposition of the fabrication material on it, or the fabrication material may be deposited first and the substrate later contorted into the desired curvature. The curvature of the previous layer may be used, when the new layer is brought into contact with it, to establish the curvature of the new layer, but the substrate must be capable of yielding to and assuming this curvature in order to maintain the relative position of the parts of the new layer as it is being brought into contact with the previous layer.

Accommodating thickness of layers to changes in curvature.

If the substrate assumes the correct curvature of the new layer prior to the deposition on it of the fabrication material, then the fabrication material may be deposited in the correct final thickness of the layer. If, however, the curvature of the substrate is to change after deposition on it of the fabrication material, then the thickness with which the fabrication material is deposited must be calculated such that the layer will assume the correct thickness when it is contorted into the correct curvature. In the simplest circumstance, where the layers are flat, the fabrication material is simply deposited in a uniform thickness for each layer.

Method of depositing fabrication material.

The fabrication material may be deposited on the substrate by any of several methods, such as:

(1) Spraying in the proper pattern and thickness, as with an ink jet mechanism.

(2) Extruding the material through a nozzle robotically guided over the surface of the substrate to form the proper pattern and thickness.

(3) Coating of the substrate with the desired material, followed by cutting through this coating in the pattern of the closed curves in the logical layer. The cutting may be accomplished by a knife blade, a laser beam, a heated element, a fluid jet, or any other means capable of cutting the material cleanly without cutting so far into the substrate as to damage the structural integrity of the substrate. After cutting, the material lying on the substrate that is not to be part of the desired object (the "negative region") may be removed from the substrate by pulling (such as by robotically manipulated tweezers) or it may be left in place to be removed by the "substrate-mediated negative removal" process, described below.

(4) Or any other means or process capable of distributing the desired material in the desired pattern and thickness on the substrate.

The method of depositing the fabrication material is an automatic process acting under instructions based on the data packages of the logical layers. For some materials, it is possible to buy the fabrication material already coated on a substrate, in which case it is only necessary to cut the outline of the layer into the material. Some examples of such materials include adhesive-backed foams and films, such as Calon® II cast vinyl film from Arlon of Santa Ana, Calif., ScotchCal® films from 3M Company of St. Paul, Minn., and sandblast stencil material from Anchor Continental, Inc. of Columbia, S.C.

Reducing layer-to-layer "graininess".

Some methods of depositing fabrication material may allow control of the slope of the edges of the fabrication material deposited. For example, when cutting a pattern in a coating on the substrate, the cutting implement may be rotated to cut on an angle so that the edge surface of the material is not perpendicular to the large surfaces. If the edge is made with a slope such that, after bonding, the corners of the edge meet the corners of the edges of both the next previous layer and the next following layer, then the result may be a smoother surface than if the edge were made perpendicular.

III Affixing The Physical Layers

Except for the first layer, each physical layer is conveyed on the substrate to a station where it is brought into contact, in precise registration, with the preceding layer to form the three-dimensional object.

Method of bonding the layers.

The bonding of a new layer to the previous layer may be by any of several mechanisms, such as:

(1) The inherent cohesiveness of the fabrication material.

(2) An adhesive component of the fabrication material.

(3) A physical process, such as heat-induced diffusion or melting of the fabrication material at the interface between the two layers.

(4) A chemical process, such as curing of the fabrication material or a component thereof.

(5) Magnetism, if the fabrication material is a magnetic material, such as Koroseal® flexible magnetic sheeting from RJF International Corporation of Cincinnati, Ohio.

(6) Or any other means or process that causes the layers to bond to each other.

The method of bonding may also involve pressing, rolling, and/or other ancillary operations to enhance the bonding achieved.

Releasable bonding.

Typically, the bonding will be permanent, but it is not necessarily so. It is also useful to use a bonding method that is capable of being released and reactivated. After fabrication of the desired object, the object may then be separated into sections. These sections may then be inspected for educational or demonstration purposes and then reassembled to reform the complete object. An example of a type of bonding that allows this sort of behavior is cohesion of a highly plasticised vinyl, such as is used in the manufacture of Stik-ees® glueless plastic decals by Stik-ees of Vista, Calif. Such cohesion is strong enough to hold together a complete object, but is capable of being released by moderate force along the interface between the physical layers, and is capable of being reactivated simply by bringing the separated sections back into contact, as long as the surfaces have remained clean during their separation. Another example of a material that would allow separation and reassembly at a cross section is magnetic sheeting, such as Koroseal®, mentioned above.

Removal of substrate.

After bonding, the substrate is removed from the new layer in preparation for the bonding of the next following layer. The characteristics of the materials and bonding processes must be such that removal of the substrate does not strain the inter-layer bonding to failure.

Substrate-mediated negative removal.

If the new layer was formed by cutting a pattern into a coating of material on the substrate (hybrid process), and if the difference in the two-dimensional shapes of the new physical layer and the previous physical layer is not such as leads to a substantial region of contact between the previous layer and the negative region of the new layer (non-interfering negative regions), then the negative region of the new layer need not be removed from the substrate prior to bonding. When the substrate is removed, the negative region of the new layer remains attached to the substrate because the negative region did not contact a sufficient area of the previous layer to engage in the bonding process. An advantage of substrate-mediated negative removal over other methods, such as pulling by robotically manipulated tweezers, is that substrate-mediated negative removal takes no additional time over the time used to remove the substrate alone. However, an alternative method of negative removal must be provided for those layers where substrate-mediated negative removal cannot be used, such as layers whose negative region would contact the previous layer (interfering negative regions).

Use of negative region as support.

In a hybrid process, when an object has a gently sloping, narrow, wall, which might tend to collapse in the fabrication process, that wall can be supported by the negative region adjacent to it, simply by leaving the negative region material in place during fabrication, instead of removing it. Since the wall is only sloping gently, there will not be a great deal of contact between each layer of the positive region and the next or previous layer of the negative region, so the supporting structure will fall away easily after the fabrication is complete. A cantilever can be supported by the negative region in a similar way, but, since there will be a great deal of contact between the negative region and the first layer of the cantilever, the top layer of the support structure should be cut out of a nonadhesive material, such as ordinary paper of the same thickness as the fabrication material. This nonadhesive material can be treated exactly as a sublayer, as discussed above under Methods of varying material composition. In an additive process, material can be added to the negative regions of certain layers to provide the same manner of support just described for a hybrid process.

Insertion of foreign object.

The fabrication process may be interrupted at any point to insert a mechanism, electronic circuit, or other foreign object into a void in the partially fabricated object. The fabrication process is then resumed.

Holding the first layer.

The first layer of the desired object is formed on the substrate in the same fashion as every other layer. However, there is no previous layer for it to bond to. Thus the fabrication process must provide a surface for the first layer to be held to. This holding must be strong enough to support the entire desired object through the fabrication process, yet it must also be capable of being released when the fabrication process is complete (unless it will be desired to leave the object affixed to the base). The method of holding may be by an adhesive that is less strong than any adhesive used between the layers, or by vacuum, or by magnetism, or by any other means or process capable of holding the first layer strongly enough, yet capable of being released. If a hybrid fabrication process is being used with substrate-mediated negative removal, then the base should have voids in it to match the negative region of the first layer. This can be accomplished by cutting the base material with the same pattern as the first layer of fabrication material.

Providing for curvature of the first layer.

The surface provided for the first layer to be held to must have the correct curvature to match the curvature of the first layer. If the first layer is not flat, then special effort is required to provide a base object with such a surface. However, this is not a difficult problem because the same fabrication equipment that will be used to build the object can first be used to build the base object with the proper curvature as its outermost surface. This base object can be fabricated with holes to convey vacuum pressure, or it can be coated with an appropriate adhesive, or it can be subjected to some other process to prepare it to hold the first layer of the new object to be fabricated. Another way to provide for the curvature of the first layer would be to use one of the techniques listed above for providing curvature of the substrate, such as a crepe-paper-like material manipulated by robotically controlled fingers, or a stretchable plastic manipulated by electromagnetically controlled rods.

Apparatus

Figure 2A:
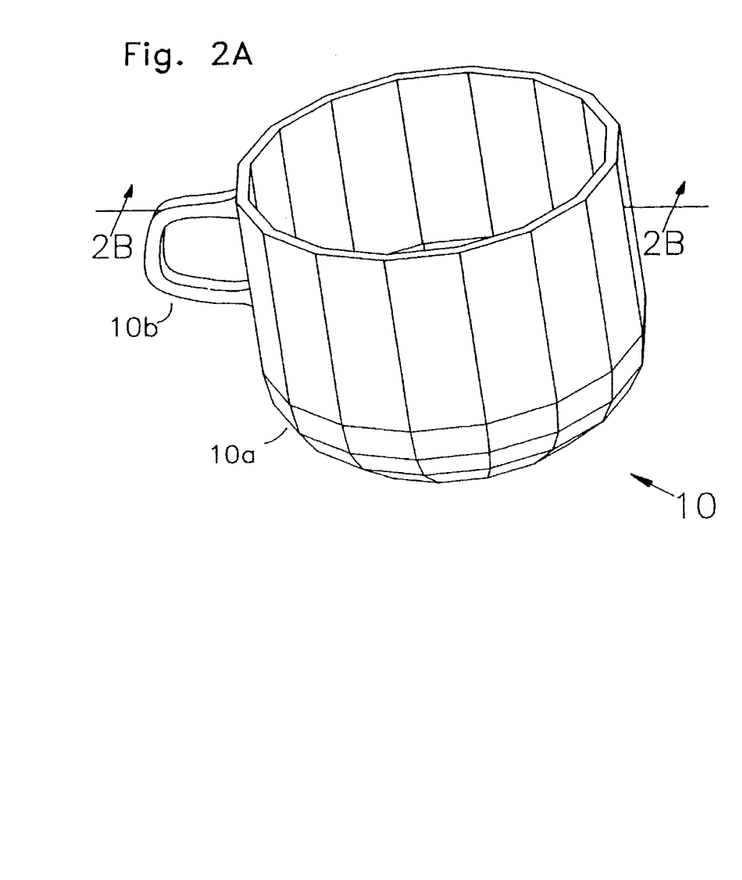
FIG. 2A is a perspective view of a three-dimensional object, a cup, made according to the method of this invention using the apparatus depicted in FIGS. 4A et seq.
Figure 2B:
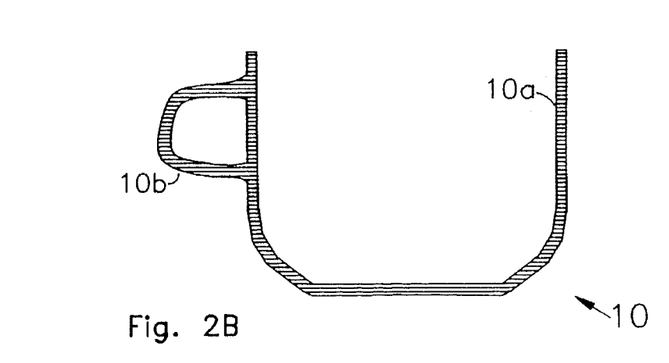
FIG. 2B is a cross-sectional view taken along line 2B—2B of FIG. 2A.
Figure 2C:
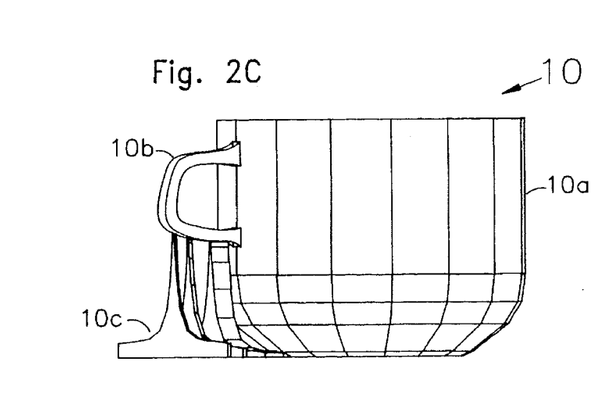
FIG. 2C is a perspective view of the cup shown in FIG. 2A using the negative regions of the fabrication material as a support for the handle of the cup.
Figure 3A:
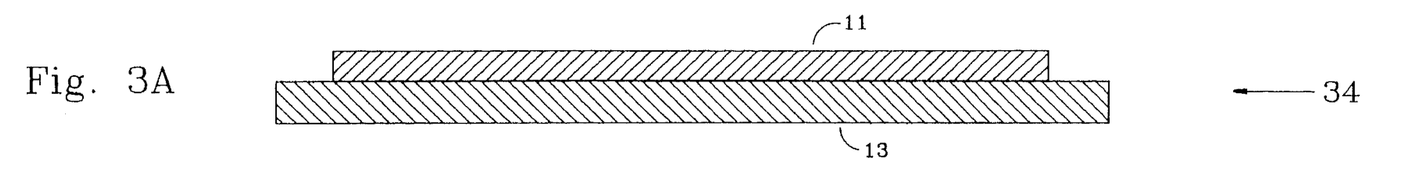
FIG. 3A is an enlarged, cross-sectional view of the fabrication material being supported by a substrate that carries the material to a stacking station.
Figure 3B:
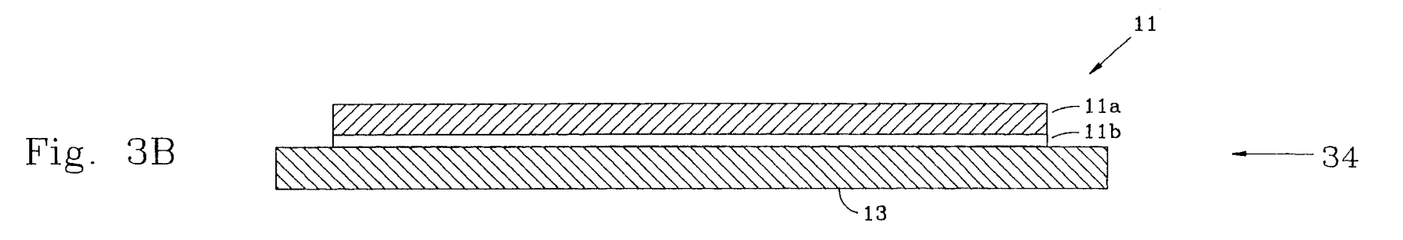
FIG. 3B is a cross-sectional view similar to that shown in FIG. 3A, where the fabrication material comprises sublayers, where one sublayer is a primary fabrication material an another sublayer is an adhesive material.
Figure 3C:
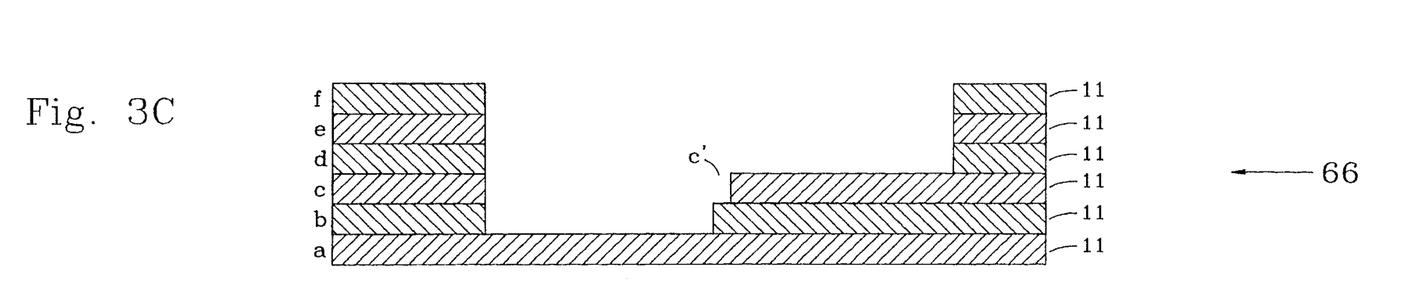
FIG. 3C is an enlarged, cross-sectional view of several physical layers of fabrication material bonded together, illustrating interfering and non-interfering regions.

As depicted in FIGS. 2A through 2C, a three-dimensional object such as a cup 10 may be fabricated from successive stacked and bonded layers of fabrication material 11 (FIG. 3C). As is conventional practice, a computer (not shown) is used to create a mathematical model of the cup 10. This mathematical model comprises a series of data packages, each data package corresponding to the physical dimensions and contour of an individual layer of fabrication material. Various techniques for carrying out the mathematical modeling are discussed in depth in Chapter 5 of *Computer-Aided Design and Manufacturing* by Farid M. L. Amirouche, Prentice Hall, 1993, and *CAD Modeling and Alternate Methods of Information Transfer for Rapid Prototyping* by Richard J. Donahue and Robert S. Turner in proceedings of the Second International Conference on Rapid Prototyping, University of Dayton, 1991.

Individual physical layers are formed from the fabrication material 11, each layer having the required dimensions and contour so that when stacked together in sequence they form the cup 10. These physical layers are placed in registration and stacked together in sequence to form the walls 10a and handle 10b of the cup 10 shown in FIG. 2A. FIG. 2C shows some negative regions 10c of fabrication material 11 used to support the handle 10b of the cup 10. After fabrication, these stacked, negative regions 10c are removed.

Figure 4A:
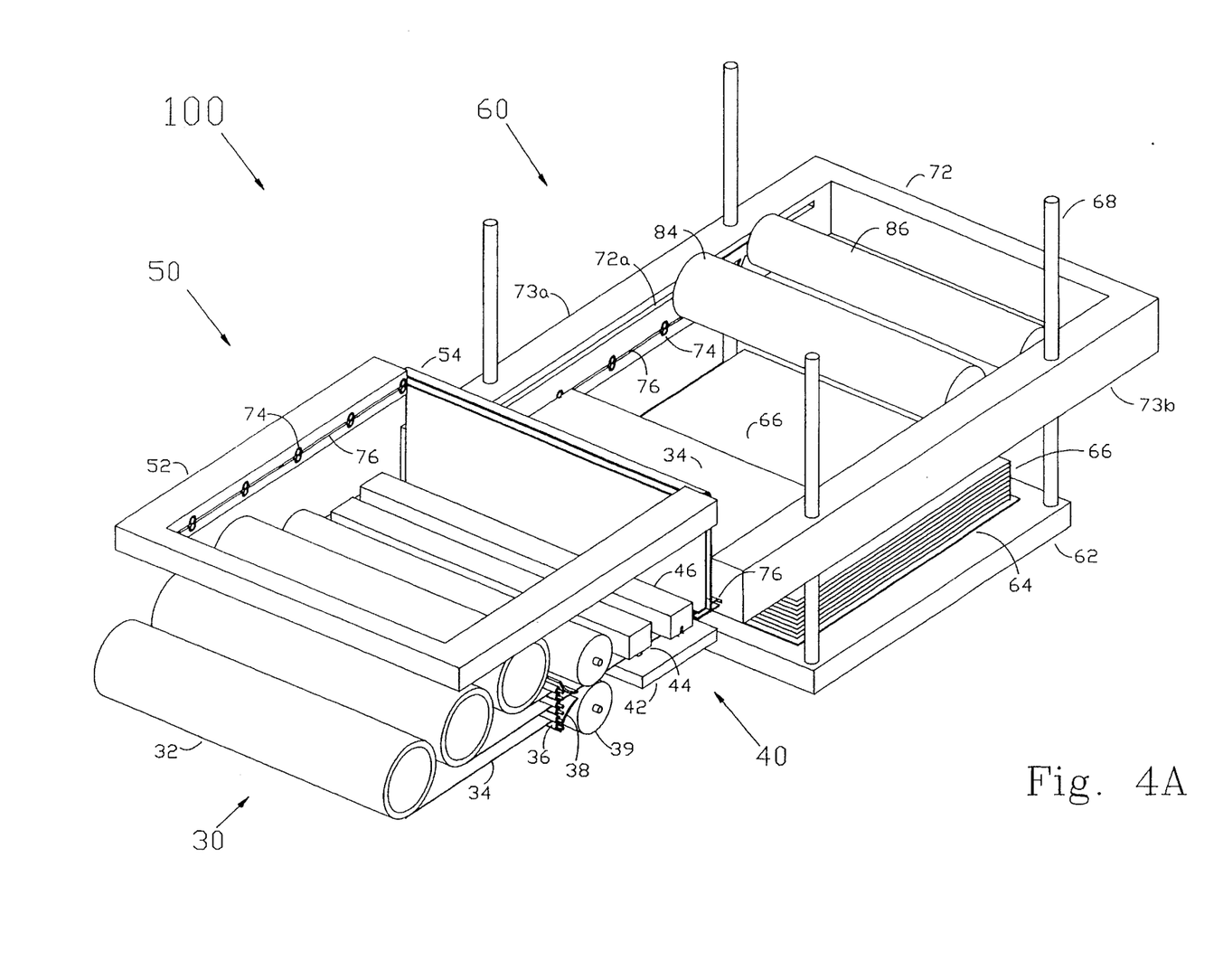
FIG. 4A is a perspective view of a fabrication unit used to form and assemble the physical layers of fabrication material.
Figure 4B:
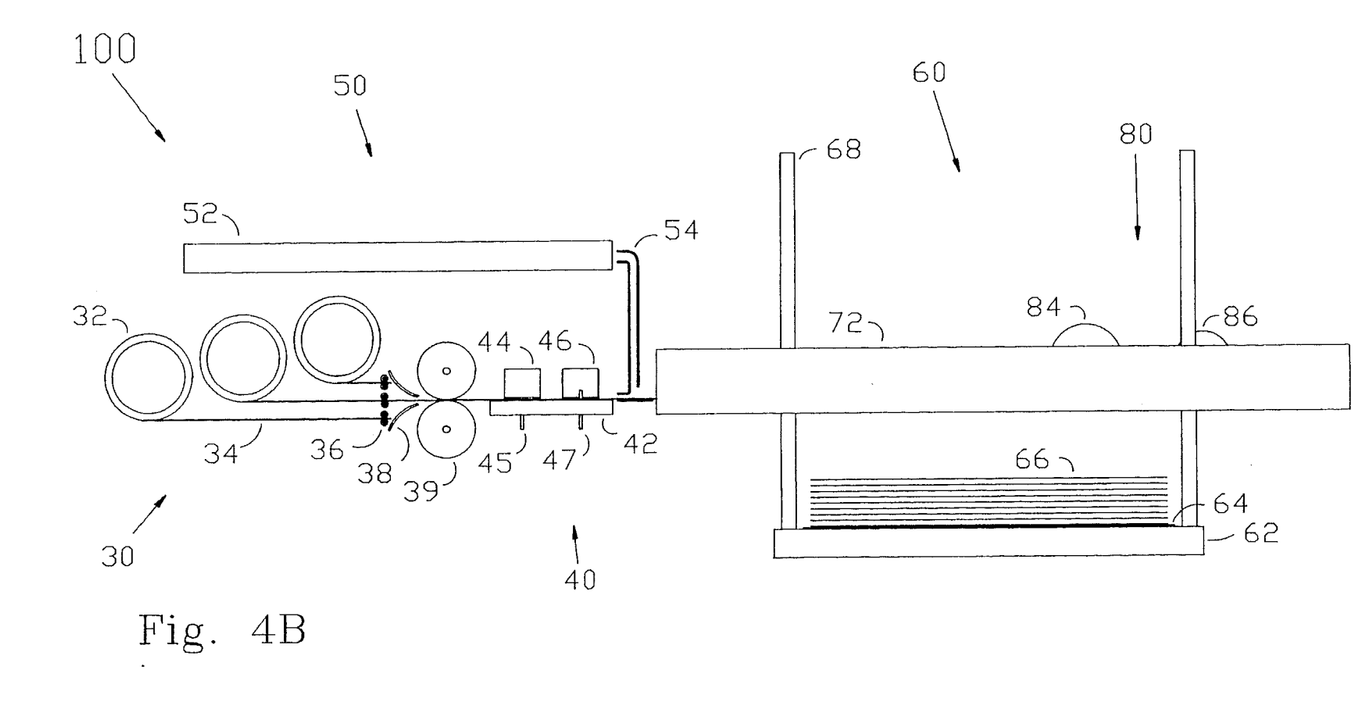
FIG. 4B is a side view of the fabrication unit shown in FIG. 4A.
Figure 6A:
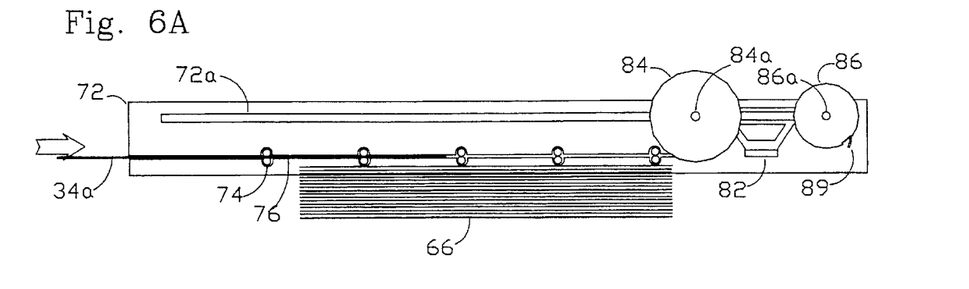
FIG. 6A is a cross-sectional of the stacker assembly of FIG. 5B, showing a substrate with fabrication material initially advancing into the stacker assembly.
Figure 6B:
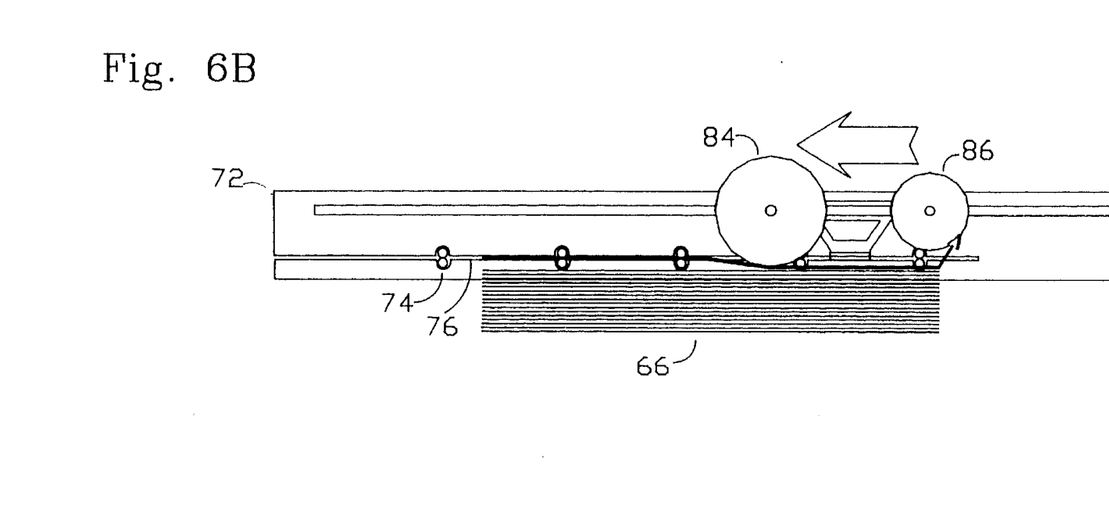
FIG. 6B is a cross-sectional of the stacker assembly of FIG. 5B, showing the advanced substrate in registration with a stack of previously aligned and bonded layers of fabrication material.

A fabrication medium 34, including a substrate 13 and a fabrication material 11, which may consist of sublayers 11a and 11b, where sublayer 11b may be an adhesive, may be used with the fabrication unit 100 shown in FIGS. 4A and 4B. A roll of adhesive-backed vinyl or other film on paper or other substrate is suitable. As depicted in FIGS. 4A and 4B, three rolls 32 of fabrication medium 34 may be used. The fabrication medium 34 from one of the three rolls 32 is selectively fed by selector rollers 36 into material selector funnel 38, and then by feed rollers 39 to a cutter assembly 40 where the medium 34 is cut into individual sheets 34a (FIG. 6A). Prior to cutting into a sheet 34a, an outline of a physical layer is cut into the fabrication material 11 without cutting through the substrate 13. This cutting process is similar to that performed by a sign cutting plotter, such as the CAMM-1 professional sign cutter from Roland Digital Group of Irvine, Calif., or the Signmaker® automated lettering system from Gerber Scientific Products of Manchester, Conn.

Figure 5A:
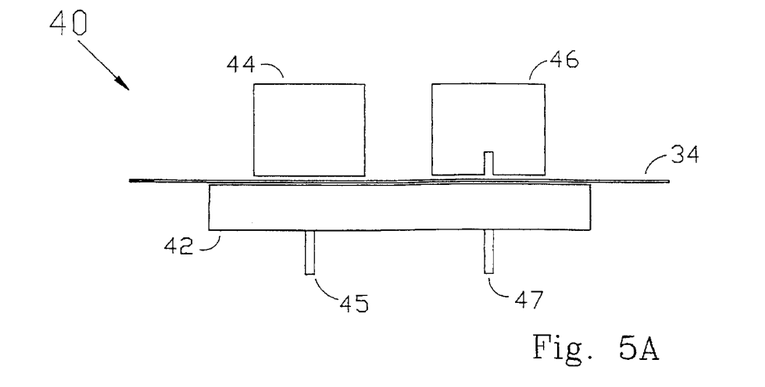
FIG. 5A is a side view of the cutter assembly of the fabrication unit shown in FIG. 4A.

As best shown in FIG. 5A, the cutter assembly 40 has base 42 which supports the fabrication medium 34. The fabrication medium 34 is fed between a contouring base 44 and a knife blade 45 which cuts the outline of the physical layer but does not cut into the substrate 13. The feed rollers 39 next advance the fabrication medium 34 between a slicing base 46 and slicing knife blade 47 which slices the medium into separate sheets. Each sheet carries a cut-a-way outline of a physical layer corresponding to a data package, including a positive region and a negative region. In certain situations, a weeder assembly 50 engages interfering negative regions and strips them prior to the sheet 34a being advanced to the stacker assembly 60. Thus, the interfering negative regions are removed from the substrate 13, and only the positive regions and non-interefering negative regions remain.

FIG. 3C depicts both intefering and non-interfering negative regions. Layers e and f have non-interfering negative regions. Layers b and d have interfering negative regions which have been removed from the substrate 13 prior to affixing the layers together. Layer c is a borderline case. Since its negative region has a small overlap c' with the underlying positive region of layer b, it may or may not interfere, depending on the relative strength of bonding between the successive layers of fabrication material 11 and the bonding between the fabrication material and substrate 13.

Figure 5B:
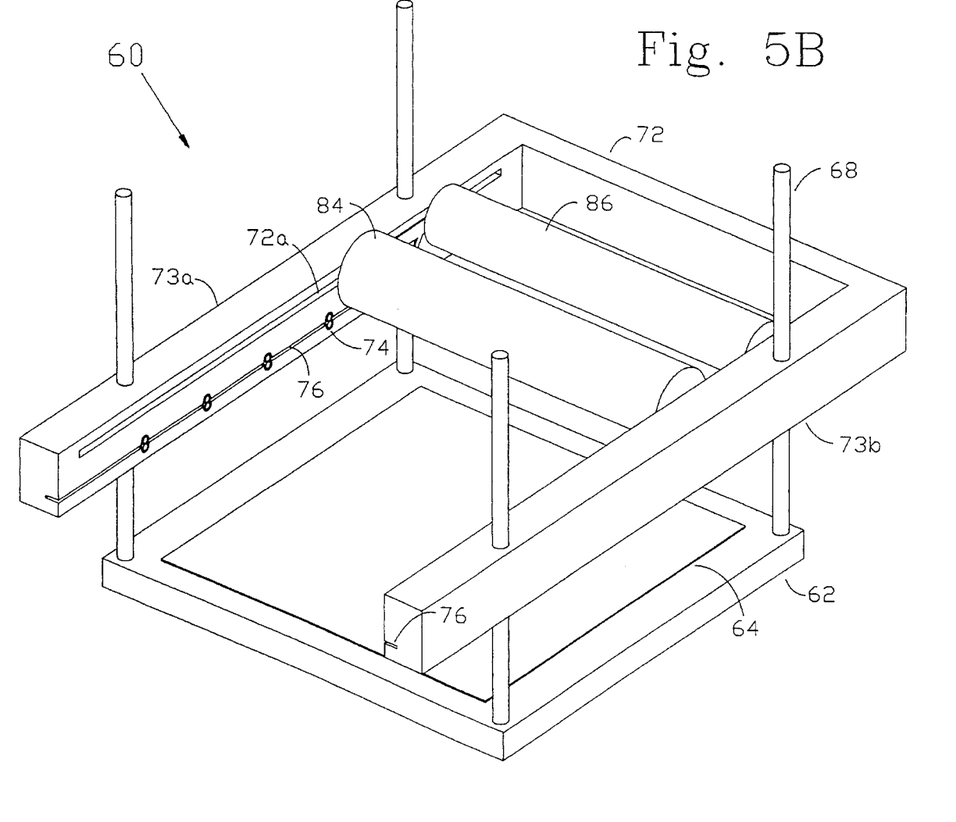
FIG. 5B is a perspective view of the stacker assembly of the fabrication unit shown in FIG. 4A.
Figure 5C:
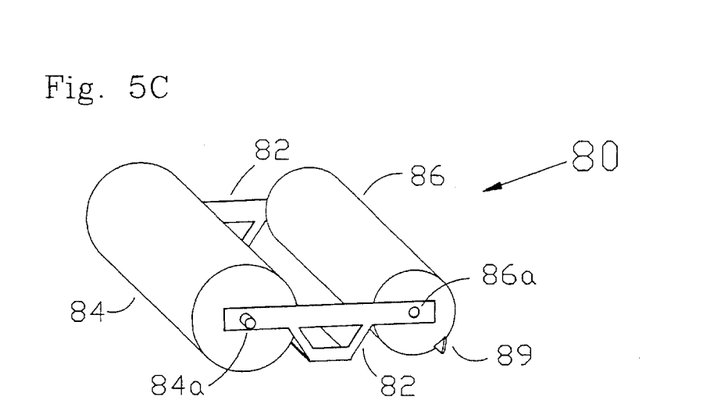
FIG. 5C is a perspective view of the roller subassembly of the stacker assembly shown in FIG. 5B.

After the cutting and weeding operations, the fabrication unit 100 advances the severed sheet 34a to the stacker assembly 60. As depicted in FIG. 5B, the stacker assembly 60 comprises a U-shaped frame 72 with a roller assembly 80, including a pair of rollers 84 and 86 attached to a bracket 82 that moves within the frame 72 across a platen 62 which supports the stacked layers 66 of fabrication material 11. Four posts 68 at the corners of the platen 62 support the frame 72. The axles 84a and 86a, respectively, of the rollers 84 and 86, move along a slotted track 72a (FIG. 6A) in the opposed arms of the frame 72.

The severed fabrication medium 34 is advanced by a series of small rollers 74 to bring it into registration with the stack 66 of fabrication material. The opposed lateral edges of the fabrication medium 34 move along opposed channels 76 in the arms 73a and 73b of the frame 72. The small rollers 74 grasp the lateral edges, feeding the fabrication medium along the channels 76 until the severed fabrication medium 34 is aligned with the stack 66.

Figure 6C:
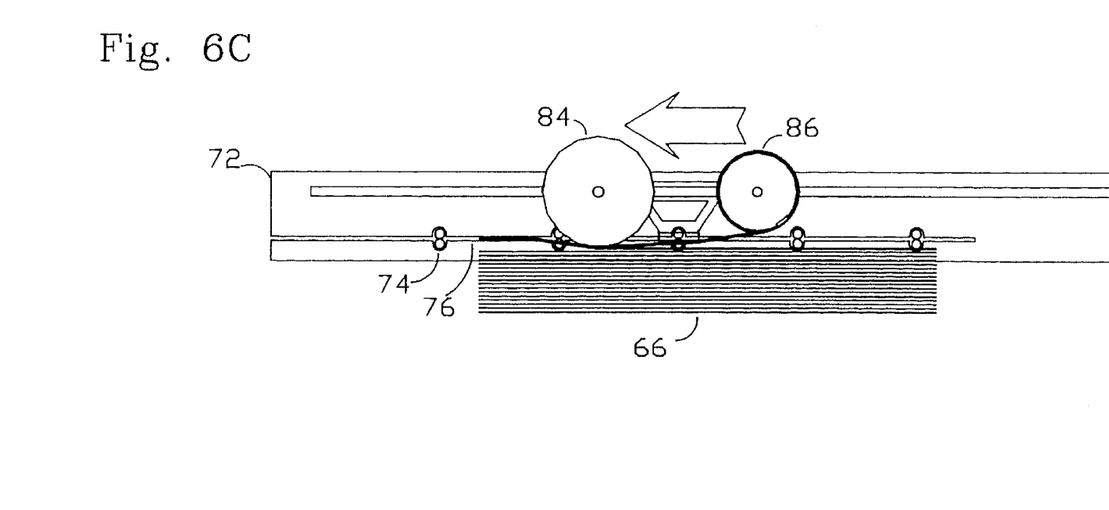
FIG. 6C is a cross-sectional of the stacker assembly of FIG. 5B, showing the roller subassembly moving across the advanced substrate to transfer the positive region of the fabrication material on the substrate to the stack. The substrate and negative region on its surface are wound up on one of the rollers of the roller subassembly.
Figure 6D:
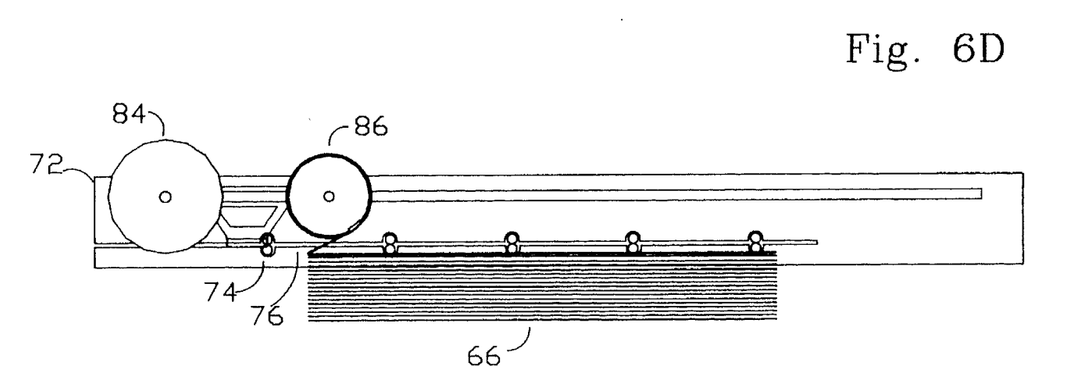
FIG. 6D is a cross-sectional of the stacker assembly of FIG. 5B, showing the completion of the transfer of fabrication material to the stack.
Figure 6E:
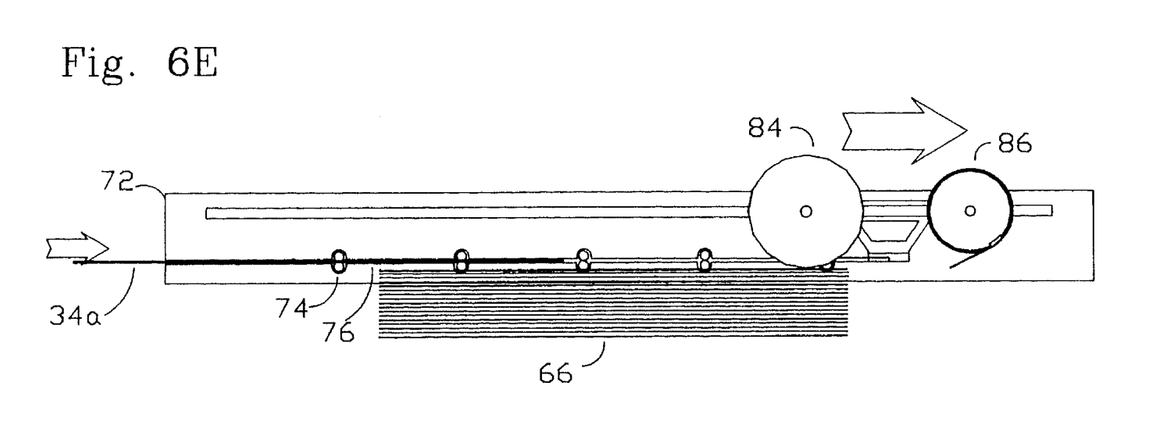
FIG. 6E is a cross-sectional of the stacker assembly of FIG. 5B, showing the roller subassembly returning to its starting position.

The one roller 86 has an edge-clamp 89 which grasps the forward end of the severed fabrication medium 34 as the pair of rollers 84 and 86 advance to the left as viewed in FIGS. 6A through 6D. The fabrication medium 34 is advanced to a point where it is in registration with the previous layers that have been affixed together and formed into the stacked layers 66. When in proper registration, the roller assembly 80 advances to the left, with the roller 84 pressing the positive region against the previous layer of material 11 so that the material of the positive region bonds to the previous layer. The non-interfering negative region remains on the substrate 13 which has its forward edge grasped by the edge-clamp 89 and wound about the take-up roller 86 as depicted in FIG. 6C. When the roller assembly 80 has advanced all the way to the left as viewed in FIG. 6D, all of the substrate and non-interfering negative region has been taken up on the take-up roller 86. The roller assembly 80 is then advanced again to the right, where the substrate 13, with the negative region thereon, is removed. The stacker assembly 60 is then ready to receive the next sheet of fabrication medium 34. In this instance, the substrate 13 is discarded along with the negative region as waste.

Figure 7:
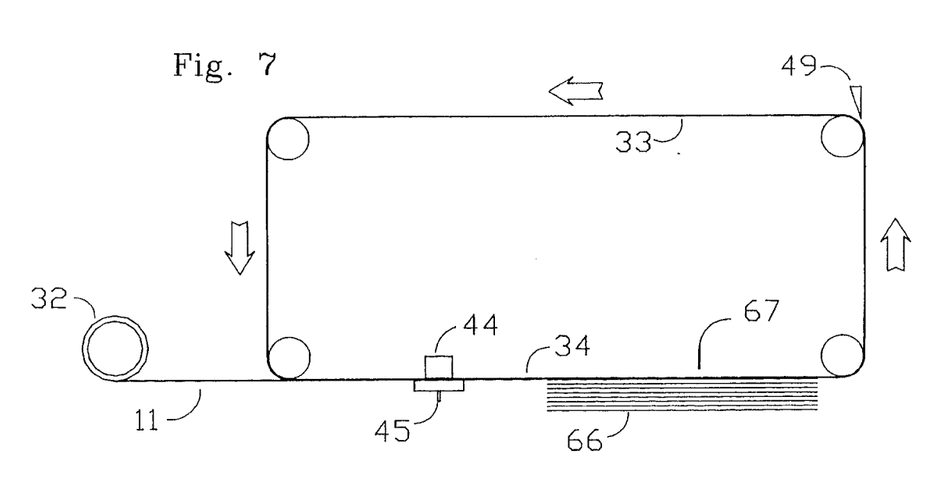
FIG. 7 is a schematic view illustrating an alternate type of fabrication equipment using an endless belt substrate to convey the fabrication material to the stacking station.

In FIG. 7, an alternate embodiment of this invention is shown where the substrate 13 consists of sections of an endless conveyer belt 33. In this embodiment, a roll 32 of fabrication material 11 advances to engage the surface of the belt 33 which carries the fabrication material between knife blade 45 and base 44. The blade 45 cuts through the fabrication material 11 to form on the substrate 33 a positive region and a negative region of the material. The belt then conveys the material 11 to a stacker assembly or station 67 where the positive region is removed and stacked with the previous layers 66. The endless belt 33 continues to carry the negative region on its surface and advances this negative region to a stripper 49 which is simply a blade which scrapes along the surface of the substrate to remove the negative region. The embodiment depicted in FIG. 7 provides for continuous use of the substrate.

Figure 8:
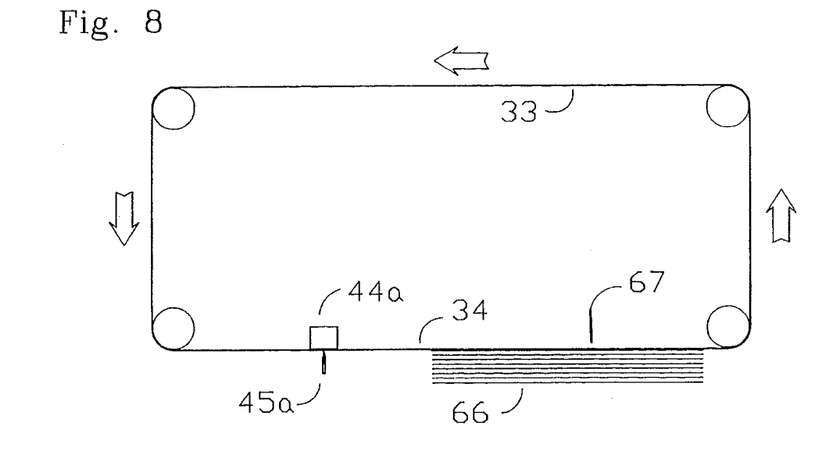
FIG. 8 is a schematic view illustrating an alternate type of fabrication equipment using a deposition device to deposit fabrication material on an endless belt substrate.

In FIG. 8, an alternate embodiment of this invention is depicted which is similar to that shown in FIG. 7. The principal difference is that the additive version of the method is employed where material is selectively deposited on the belt 33. A suitable deposition material is, for example, a hardenable paste or gel. In accordance with this embodiment, the material is deposited as a layer with precise, predetermined boundaries so that no negative region is present on the substrate. A suitable deposition device 45a may be a drop-on-demand ink jet as used in the Hewlett-Packard DeskJet printer, or a continuous-mode ink jet as used in the Soligen DSP fabricator.

One of the important features of this invention is the use of successive carrier substrates 13 to convey fabrication layers. The same substrate, however, may be repeatedly reused and moved reciprocally between the fabrication station and the stacking station, or the substrate may be discarded after each use. Each is considered successive carrier substrates.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention.

I claim:

1. Apparatus for fabricating a three-dimensional object from a fabrication material, said apparatus including
a layer formation station at which is formed on a substrate an individual layer of fabrication material which has an exterior surface and an internal bonding surface which bonds the fabrication material to the substrate but allows the substrate to be removed to expose the bonding surface upon separation of the substrate from the fabrication material, a stacking station at which a series of successive, individual layers of fabrication material are stacked in a predetermined sequence and affixed together to form said object, a conveyor for conveying the substrate with the individual layer of fabrication material thereon to said stacking station, a registration mechanism which aligns successive, individual fabrication layers so that said successive, individual fabrication layers are in registration, and an affixing and separating mechanism at said stacking station which (i) brings the exterior surface of the fabrication material of said layer into contact with an exposed, internal bonding surface of a previously stacked fabrication layer, so that the layers become affixed, and (ii) separates the substrate from the individual fabrication layer thereon by incrementally pulling the substrate from the fabrication material to expose the bonding surface of said layer, so that another successive fabrication layer may be bonded thereto.

2. The apparatus of claim 1 where the successive carrier substrates are sections of a continuous belt which travels along a predetermined path past said layer formation station and stacking station.

3. The apparatus of claim 1 where the fabrication material includes an adhesive which holds the substrate to the fabrication material, and the adhesive is exposed to create the bonding surface upon separation of the carrier substrate.

4. The apparatus of claim 1 where the fabrication material is selected from the following group:

(a) hardenable pastes and gels, (b) molten metals, thermoplastics, and ceramics, which harden by freezing, (c) hardenable plastic resins, (d) plastic, metal, paper or ceramic sheets with or without adhesive coating, and (e) combinations of plastic, metal, or ceramic sheets, strips, or filaments with molten, thermosetting, or other type of binder or matrix material, or both.

5. The apparatus of claim 1 where at least some of the layers are nonplanar.

6. The apparatus of claim 1 where the layers vary in thickness.

7. The apparatus of claim 1 where the layers vary in color.

8. The apparatus of claim 1 where the successive layers vary in outline.

9. The apparatus of claim 1 where the layers vary in material composition.

10. A method for fabricating a three-dimensional object from fabrication material formed into individual successive layers having a predetermined configuration, where successive individual layers are stacked in a predetermined sequence and affixed together to form said object, said method including (a) providing a stacking station were the successive individual layers are stacked together, (b) forming on a surface of one or more carrier substrates a series of layers of fabrication material corresponding to the configuration of the individual successive layers, (c) conveying said individual successive layers on a carrier substrate to said stacking station, (d) aligning the layers and bringing each of said individual layers into contact with a successive individual layer so that said layers become affixed, and (e) after one of the layers is affixed to another layer, separating said carrier substrate from said one layer by grasping a portion of the substrate bearing said one layer and incrementally pulling sections of said substrate away from the fabrication material, exposing a bonding surface on said one layer to which another successive fabrication layer is affixed.

11. The method of claim 10 where the affixing of the layers is promoted by pressing, rolling, heating, or combinations thereof.

12. The method of claim 10 where the individual layers are formed by depositing fabrication material on the carrier substrate in the desired configuration corresponding to said individual layer.

13. The method of claim 12 where the amount of fabrication material to be deposited at each location on the substrate is calculated to adjust for changes which will occur in the thickness of the material due to changes in the shape of said layer.

14. The method of claim 10 where the fabrication material is (a) a hardenable paste or gel; (b) a molten metal, thermoplastic, or ceramic which hardens by freezing; (c) a curable plastic resin; (d) a plastic, metal, paper or ceramic sheet, with or without adhesive, (e) a combination of these materials with each other; (f) or a combination of these materials with plastic, metal, or ceramic sheets, strips, or filaments.

15. The method of claim 10 where each individual layer is formed by placing the fabrication material on the carrier substrate and dividing said fabrication material into a positive region corresponding to said individual layer and a negative region of waste material.

16. The method of claim 15 where the fabrication material is divided by cutting said material while supported on the carrier substrate without cutting substantially into said carrier substrate.

17. The method of claim 10 where at least some of said layers have a nonplanar shape.

18. The method of claim 17 where said nonplanar-shaped layers are induced to assume said nonplanar shapes prior to being brought into contact with the next previously formed layer.

19. The method of claim 18 where each said nonplanar shape is induced in each said layer by inducing said nonplanar shape in the substrate before forming the layer on said substrate.

20. The method of claim 18 where each said nonplanar shape is induced in each said layer and its substrate together after forming the said layer on the said substrate.

21. The method of claim 17 where, if a predetermined layer is to have a nonplanar shape which mates with a similar nonplanar shape of a previously formed layer, then the said predetermined layer is induced to assume its nonplanar shape by being laid in contact with the said previously formed layer.

22. The method of claim 17 where, if a predetermined layer is to have a nonplanar shape which does not mate with a similar nonplanar shape of the previously formed layer, then said predetermined layer is induced to assume its nonplanar shape by being laid in contact with a support located in a predetermined position in the station to mate with said predetermined layer and induce therein said nonplanar shape.

23. The method of claim 22 where the said support is fabricated by the same method being used to fabricate said object.

24. The method of claim 10 where at least some of the said layers have varying thickness.

25. The method of claim 24 where said layers of varying thickness are formed by depositing different amounts of fabrication material at different locations on the carrier substrate.

26. The method of claim 10 where at least some of the said layers have nonhomogeneous material composition.

27. The method of claim 26 where layers of nonhomogeneous material composition are formed by depositing different compositions of material at different locations in said layer.

28. The method of claim 26 where said layers of nonhomogeneous material composition are formed by forming and affixing a sequence of sublayers, the total material composition of which said sublayers taken together is the material composition of the said layers.

29. The method of claim 28 where all interfaces between the said sublayers within the said layer extend along the entire thickness of said layer, and each sublayer is affixed to the immediately previous layer.

30. The method of claim 28 where the interfaces between the said sublayers within the said layer do not all extend along the entire thickness of said layer, and at least some of the sublayers are affixed to other sublayers within the said layer.

31. The method of claim 26 where the said nonhomogeneity causes the said object to exhibit differences in hardness, mass density, coefficient of thermal expansion, color, or other physical properties.

32. The method of claim 10 where a set of measurements is taken after each layer is affixed to determine the resulting dimensions of a portion of the object built so far, and these measurements are fed back to a control computer for the purpose of allowing the control computer to calculate the correct outline, curvature, thickness, and material composition for the next layer to be fabricated for affixing to said portion of the object built so far in order to produce a final object with the correct total size, shape, and material composition.

\* \* \* \* \*